(12) United States Patent
Werres et al.

(10) Patent No.: US 6,706,145 B2
(45) Date of Patent: Mar. 16, 2004

(54) AQUEOUS ADHESIVE DISPERSIONS AND THE USE THEREOF IN THE PRODUCTION OF MULTI-LAYERED PAPER

(75) Inventors: Joachim Werres, Drebber (DE); Bernd Reinhardt, Osnabrueck (DE); Klaus Rienaecker, Osnabrueck (DE)

(73) Assignee: Ahlstrom GmbH, Osnabrueck (DE)

( * ) Notice: Subject to any disclaimer, the term of this patent is extended or adjusted under 35 U.S.C. 154(b) by 0 days.

(21) Appl. No.: 09/720,808

(22) PCT Filed: Jul. 1, 1999

(86) PCT No.: PCT/EP99/04542

§ 371 (c)(1),
(2), (4) Date: Jan. 3, 2001

(87) PCT Pub. No.: WO00/01783

PCT Pub. Date: Jan. 13, 2000

(65) Prior Publication Data

US 2003/0155071 A1 Aug. 21, 2003

(30) Foreign Application Priority Data

Jul. 3, 1998 (DE) .......................... 198 29 757

(51) Int. Cl.$^7$ ........................ D21H 19/10; B32B 31/08; B32B 31/12; C09J 103/02

(52) U.S. Cl. .................... 162/124; 137/164.6; 137/175; 137/184; 137/186; 106/205.6; 106/205.72; 106/214.4; 106/215.5; 427/411; 427/421; 156/302; 156/307.3; 156/307.7; 156/324

(58) Field of Search ................. 156/307.3, 307.7, 156/302, 324; 427/391, 411, 421, 395; 106/145.1, 156.5, 206.1, 705.72, 214.1, 215.5, 205.6; 162/123, 124, 127, 135–137, 183–186, 175, 168.4

(56) References Cited

U.S. PATENT DOCUMENTS

| | | | | |
|---|---|---|---|---|
| 2,282,364 A | * | 5/1942 | Kunze et al. ............ | 106/205.6 |
| 3,336,246 A | * | 8/1967 | Golick et al. ............... | 524/797 |
| 4,285,764 A | * | 8/1981 | Salvai ........................ | 162/132 |
| 4,424,291 A | * | 1/1984 | Leake et al. .................. | 524/47 |
| 4,775,706 A | * | 10/1988 | Iovine et al. ................. | 524/47 |
| 5,055,503 A | * | 10/1991 | Leake et al. .................. | 524/30 |
| 5,190,996 A | * | 3/1993 | Foran et al. .................. | 524/28 |
| 5,405,501 A | * | 4/1995 | Phan et al. .................. | 162/127 |
| 5,647,956 A | | 7/1997 | Elliott et al. | |
| 5,736,209 A | * | 4/1998 | Andersen et al. .......... | 428/36.4 |
| 5,883,242 A | * | 3/1999 | Kubota et al. ................. | 536/45 |
| 5,944,954 A | * | 8/1999 | Vinson et al. ............... | 162/111 |
| 6,168,857 B1 | * | 1/2001 | Andersen et al. ........ | 428/292.1 |
| 6,207,734 B1 | * | 3/2001 | Vinson et al. ................ | 524/47 |
| 6,238,520 B1 | * | 5/2001 | Greenwood .............. | 162/164.1 |

FOREIGN PATENT DOCUMENTS

| | | | |
|---|---|---|---|
| DE | 18 09 824 | 8/1969 | |
| DE | 15 46 416 | 7/1970 | |
| DE | 2 26 581 | 8/1985 | |
| DE | 44 01 529 | 7/1995 | |
| EP | 0 013 416 | 7/1980 | |
| EP | 0 113 038 | 7/1984 | |
| EP | 0 310 078 | 4/1989 | |
| EP | 0 415 385 | 3/1991 | |
| EP | 0 555 993 | 8/1993 | |
| EP | 0 606 431 | 7/1994 | |
| EP | 0 742 316 | 11/1996 | |
| FR | 1 282 904 | 12/1961 | |
| WO | WO 96/23038 | 8/1996 | |
| WO | WO 97/11226 | 3/1997 | |
| WO | WO 97/12226 | * 3/1997 | .......... D21H/27/32 |

OTHER PUBLICATIONS

Chemical Abstracts, vol. 128, No. 19, May 11, 1998, AN 231786, JP 10 088090, Apr. 7, 1998.

Derwent Publications, AN 1993–297883, JP 05 209159, Aug. 20, 1993.

F. Andruchovici, et al., PTS–Forschungsbericht PTS–FB, 5 pages, "Untersuchung Der Eignung Modifizierter Staerkeklebstoffe Fuer Die Spruehauftragstechnik Am Beispiel Der Papiersack–Herstellung", Sep. 1993.

K. Sato, Research & Development Div. Arakawa Chemical Industries, Ltd., vol. 49, No. 2, pp. 318–323, "New Strength Agent for Spraying Between Layers", 1995 (with English Abstract).

* cited by examiner

*Primary Examiner*—Steven P. Griffin
*Assistant Examiner*—Eric Hug
(74) *Attorney, Agent, or Firm*—Oblon, Spivak, McClelland, Maier & Neustadt, P.C.

(57) ABSTRACT

An aqueous adhesive dispersion comprising an adhesive polymer in dispersed form, an anionic or cationic polyelectrolyte, and optionally at least one polyalkylene glycol having a molar mass of 200 to 100,000 g/mol, and other additives; and a process for producing multilayered paper or a material using the aqueous adhesive dispersion.

18 Claims, No Drawings

AQUEOUS ADHESIVE DISPERSIONS AND THE USE THEREOF IN THE PRODUCTION OF MULTI-LAYERED PAPER

The invention relates to aqueous adhesive dispersions and to a process for producing multilayered paper, cardboard and carton having improved layer and ply strength, using said adhesive dispersions.

Multilayered papers are obtained from paper pulp mixtures of same or different composition by compressing (couching) the wet paper webs. Essentially, the quality of multilayered packaging papers or cartons is determined by the internal strength of these materials, the cohesion in the interface region between the individual plies of paper representing a weak point, however. Therefore, adhesive starch or starch derivatives are frequently used to improve the layer and ply strength. When exposed to major shear forces, heat or increased moisture during storage and further processing, however, stability may be lost even in products produced in this fashion, and the material may undergo breaking.

To date, native or modified starch in the form of an aqueous dispersion is sprayed as adhesive onto or between the paper plies, undergoing gelatinization in the drying section of the paper machine, thereby effecting bonding of the plies. Frequently, however, the layer and ply strength achieved in this manner is limited, particularly in those cases where the starch bonding undergoes complete or partial irreversible embrittlement during subsequent heat exposure. According to F. Andruchovici and R. Wilken, PTS-Verlag Munich, 1994, PTS-Forschungsbericht, PTS-FB 09/93, p. 19, the use of native starch is disadvantageous in that native starch can be employed with only low solids content due to its rheological characteristics (high viscosity), while the exclusive use of cationic starch is disadvantageous for cost reasons.

According to EP-B-310,078, an adhesive composition of stable viscosity on the basis of gelled particulate starch is used in the production of corrugated cardboard, which starch is employed together with a polymeric thickening agent of basic reaction, such as an acetone-formaldehyde resin, in the form of an aqueous dispersion.

A concentrated starch glue for the production of corrugated cardboard is known from DE-A-44 01 529, which includes an ionic surfactant to reduce its viscosity.

According to EP-B-415,385, surface and web strength and tear resistance of paper and cardboard are achieved by spraying the wet paper webs with a slurry of non-gelled starch grains having a gel temperature of 35–55° C., previously obtained by heating a mixture of crude starch, urea, phosphoric acid or a phosphate at a temperature of 80–150° C. for a period of from 0.5 to 5 hours.

Other paper sizing agents are known from EP-A-742,316, which agents include cationized starch preferably esterified with unsaturated dicarboxylic acids or anhydrides.

These well-known adhesives can only be produced with high technical input and have an adhesive effect that is insufficient for many applications.

Likewise, the use of polyacrylamide instead of starch as strengthening agent in spray coating, as described by K. Sato in Japan Tappi Journal 49, 318–323 (1995), No. 2, is inappropriate. Alternatively, the product is employed in the form of a solution which, however, not only remains on the surface of the paper web after spraying, but rather, penetrates therein.

Furthermore, a process for producing an abrasion-resistant decorative laminate is known from EP-B-555,093, wherein an aqueous slurry of aluminum oxide particles and a high molecular weight cationic retention agent such as polyacrylamide is coated on the uppermost wet layer of paper material and then subjected to further conventional paper manufacturing.

EP-B-606,431 describes a composition for coating cardboard, containing cationic starch and a vinyl acetate polymerization product which are also coated together with pigments. As is well-known, however, laminating of paper sheet materials involves other requirements as compared to the production of multilayered paper per se.

It was therefore the object to provide an adhesive dispersion that would enable easy production of multilayered paper with improved properties, particularly with enhanced layer and ply strength.

Said object is accomplished by providing the aqueous adhesive dispersions according to the invention, containing A) 0.1–10 wt.-%, preferably 2–6 wt.-%, relative to the overall weight of the dispersion, of an adhesive polymer in dispersed form, B) 0.1–100 parts by weight, preferably 0.1–20 parts by weight, more preferably 0.1–10 parts by weight, relative to 100 parts by weight of component A), of at least one anionic or cationic polyelectrolyte, and C) 0–50 parts by weight, preferably 0.1–30 parts by weight, more preferably 0.1–20 parts by weight, relative to 100 parts by weight of component A), of at least one polyalkylene glycol having a molar mass ranging from 200 to 100,000 g/mol.

At least one natural or synthetic adhesive polymer, preferably a polysaccharide, an optionally modified polysaccharide, a protein, and/or a polyvinyl alcohol is used as component A), which polymer is present in dispersed form in said dispersion, i.e., has not been heated above its gelatinization temperature.

It is particularly preferred to use starch, modified starch, cellulose ethers such as carboxymethylcellulose, polyvinyl alcohols, alginates, proteins such as glutin, casein, and/or guar meal as adhesive polymers. However, starch and/or starch derivatives are preferred for economic reasons.

In this context, native starch, such as potato starch, wheat starch, corn starch, rice starch, pea starch and/or mixtures thereof, modified starches such as starch degradation products, particularly dextrins, chemically modified starches such as substituted starch derivatives and especially anionic starches such as dialdehyde starch, carboxystarch, and starch degraded by persulfate, anionic starch esters such as starch phosphoric acid mono- or di-esters, starch acetates and starch citrates, anionic starch ethers such as carboxymethylstarch, carboxymethyl-2-hydroxyethylstarch, and carboxymethyl-3-hydroxypropylstarch, and cationic starch derivatives such as N-containing starch ethers, particularly starches having primary or secondary amino or imino groups, and tertiary amino groups positively charged by protonation with acids, and quaternary ammonium groups are used.

The cationic or anionic polyelectrolytes to be used as component B) according to the invention are selected from the group of synthetic or optionally modified natural polymer products. Preferably, they are water-soluble or water-swellable cationic or anionic synthetic homo- or co-polymers of monoethylenically unsaturated monomers with acid groups which at least partially are present as salts, or their esters with $di(C_1-C_2)alkylamino(C_2-C_6)$ alkylalcohols, or their amides with $di(C_1-C_2)alkylamino(C_2-C_6)alkylamines$ as reported in EP-A-0,013,416 or in EP-A-0,113,038, each one being used in protonated or quaternized form, and optionally other monoethylenically unsaturated monomers.

These polyelectrolytes are remarkable in that they do not act as a flocculant for component A) below the gelatinization temperature thereof, but rather, form stable aqueous dispersions with A).

Preferably, homopolymers or copolymers of water-soluble, monoethylenically unsaturated vinyl compounds, such as acrylic acid and methacrylic acid esters of dialkylaminoalkylalcohols in protonated or quaternized form, such as dimethylaminoethyl acrylate, acrylic acid and methacrylic acid amides of dialkylaminoalkylamines, in protonated or quaternized form, such as acrylamidopropyltrimethylammonium chloride and/or acrylamidopropyltrimethylammonium methyl methosulfate can be used as cationically active polyelectrolytes.

Furthermore, Mannich bases of polymers containing acrylamide, polyvinylamines, polyamines such as diethyleneamine, dipropylenetriamine, triethylenetetramine, and polyalkylenepolyamines (polyethyleneimines) with molar masses of from 450 to 100,000 g/mol, preferably liquid polyalkylenepolyamines with molar masses of from 450 to 20,000 g/mol or solutions thereof in water are suitable as cationic polyelectrolytes.

In case the dispersions according to the invention do not include any component C, only those polymer products are possible—when using polymers as cationic polyelectrolytes—that do not include any aldehyde or methylol groups as functional groups.

Preferably, homo- and/or copolymers of monoethylenically unsaturated carboxylic acids and sulfonic acids, such as acrylic acid, methacrylic acid, maleic acid, itaconic acid, crotonic acid and/or the alkali, preferably sodium, potassium or ammonium salts thereof, vinylsulfonic acid, acrylamido- and methacrylamidoalkanesulfonic acids such as 2-acrylamido-2-methylpropanesulfonic acid, 2-sulfoethyl methacrylate, and styrenesulfonic acid, and/or the alkali, preferably sodium or potassium or ammonium salts are suitable as anionic polyelectrolytes.

Furthermore, vinylphosphonic acid and styrenephosphonic acid, as well as the alkali salts, preferably the sodium or potassium or ammonium salts thereof are suitable.

The copolymers can be formed using the above-mentioned ionic monomers and non-ionogenic, water-soluble, monoethylenically unsaturated monomers such as acrylamide, methacrylamide, N-($C_1$–$C_2$)alkylated (meth)acrylamides, as well as N-vinylamide, vinylformamide, N-vinylacetamide, N-vinyl-N-methylacetamide, N-vinylpyrrolidone. In addition, suitable water-soluble monomers are N-methylolacrylamide, N-methylolmethacrylamide, as well as N-methylol(meth)acrylamides partially or completely etherified with monohydric $C_1$–$C_4$ alcohols, and diallyldimethylammonium chloride.

Likewise, the copolymers may include limited amounts of sparingly water-soluble and/or water-insoluble monoethylenically unsaturated monomers such as (meth)-acrylic acid alkyl esters and vinyl acetate, as long as the solubility or swellability of the copolymers in water is retained.

Moreover, the polymers products can be produced using crosslinking monomers having at least two reactive sites, preferably diethylenically unsaturated monomers, so as to have swellability or only limited solubility in water, or they may consist of water-soluble and water-swellable polymers.

According to the invention, water-soluble or water-swellable amphiphilic copolymers produced of cationic and anionic monomers may also be used.

Furthermore, melamine-formaldehyde condensation products and urea-formaldehyde condensation products in anionic and cationic modification, polyamidoamine-epichlorohydrin resins, e.g. the reaction products of adipic acid with diethylenetriamine, or of similar amines and epichlorohydrin are suitable as component B).

The polyelectrolytes used according to the invention can be mixed with the adhesive polymers as a powder, dispersion or solution, preferably as an aqueous solution.

The weight ratio of the amounts of components A) and B), relative to the total amount of components A) and B), preferably ranges from 4:1 to 25:1, more preferably from 10:1 to 25:1, with a range of from 14:1 to 20:1 being particularly preferred.

Furthermore, the adhesive dispersions of the invention may additionally include other additives such as surfactants, wet-strength agents, sizing agents, hygroscopic agents, and pigments.

The adhesive dispersions are produced by combining the polymer and polyelectrolyte components, the components being placed in a vessel in any order, in portions or continuously in an aqueous phase, preferably as an aqueous dispersion, mixed by stirring or pumping, and optionally heated below the gelatinization temperature of component A). The adhesive polymer A) is heated at a temperature below the gelatinization temperature, namely, at 30–55° C., preferably 35–50° C., more preferably 40–45° C., and simultaneously or subsequently added with a solution or dispersion of the polyelectrolyte of optionally the same or optionally the opposite ionogenicity. optionally, the dispersion can be heated to the maximum temperature below the gelatinization temperature for a certain period of time.

The addition of polyalkylene glycol to the dispersion can be effected as such or in the form of an aqueous solution of the polyalkylene glycols prior to or subsequent to adding component A) or preferably subsequent to adding component B). Heating of the dispersion, particularly the duration thereof, and the pH value of the aqueous dispersion can be determined by a person skilled in the art using simple tests depending on the raw materials used and the equipment-related conditions present and are selected in such a way that the gelatinization temperature of the components will not be exceeded. By adding the polyelectrolytes B) to component A) and heating the dispersion, the condition of the homogeneous dispersions is retained.

Heating of the dispersion may also be effected in such a way that the components are heated one by one or placed in preheated water.

The production of multilayered paper is well-known and is effected using paper machines equipped with multilayer screen sections, on which multiple paper webs are formed. To this end, rotary screens arranged in a well-known fashion, rotary screen molds, or an endless wire section as sheet-forming system, consisting of e.g. 2–6 endless wires, are used. Thereafter, the paper webs formed on the screen sections are treated in wet condition with the adhesive dispersions of the invention, the adhesive being coated onto at least one paper web, the webs are contacted and subsequently combined to form a thicker web. When subsequently passing the drying section, final sizing of the paper webs is effected using the adhesive dispersion.

Coating the adhesive dispersion onto at least one of the wet paper webs can be performed using the well-known coating techniques as reported e.g. in F. Andruchovici and R. Wilken, PTS-Verlag Munich, 1994, PTS-Forschungsbericht, PTS-FB 09/93, p. 16. According to the invention, in particular, the spraying technique is preferred over concurrent or countercurrent feed roll coating where wetting of the paper web can be effected over the entire surface, or limited e.g. by templates. To achieve sufficient sprayability of the adhesive dispersion, water-soluble polymers having a molecular weight m.w. (g/mol) of from 1000 to 2 millions, preferably from 1000 to 100,000, and more preferably from 1000 to 50,000 are preferably used as component B). Appropriate polymer products are obtained in a well-known fashion by adjusting the polymerization conditions, using suitable initiator and modifier combinations. Furthermore, it is possible to start off with high molecular weight polymer products and subject same to mechanical degradation, e.g. by shearing in aqueous solution, prior to combining with component A).

The adhesive dispersions according to the invention are remarkable for their excellent shelf-life when dispersed in aqueous phase.

When coating the adhesive dispersions of the invention, the dispersed portions precipitate on the surface or in the upper fibrous region of the paper web. The combined wet paper webs then pass the press section and subsequently the drying section of the paper machine where bonding of the paper webs to be treated is effected under the conditions present therein to form a multilayered paper.

Therefore, the present invention is also directed to methods of producing multilayered papers and other sheet materials comprised of paper material and made up of at least 2 paper webs, using the adhesive dispersions according to the invention, particularly in manufacturing packaging paper, corrugated cardboard, multi-web solid cardboard, carton, and multilayered test liner, as well as base paper for wallpapers, and other multilayered special papers remarkable for their enhanced stability and strength, particularly with respect to layer and ply strength.

Preferably, from 1 to 10 wt.-%, more preferably from 4 to 8 wt.-%, relative to the paper production, of the aqueous dispersion according to the invention is used.

Without intending to be limiting, the invention will be described in more detail with reference to the following Examples.

COMPARATIVE EXAMPLE 1

The production of a multilayered cellulose special paper is performed on a paper machine having 4 rotary screens, producing a base paper having a gram weight of about 270 g/m² made up of layers having a weight of 60–70 g/m². To increase the layer and ply strength, a 2% aqueous starch dispersion continuously produced from a cationic starch designated Emcat® C 12 (Emsland Stärke Company) in a dispersing tank is sprayed in an amount of 6 wt.-%, relative to the paper production, between each of the wet paper layers. After passing the paper web through the drying section, a base paper having a ply strength of 1.735 N/cm and a layer strength of 1.559 N/cm is obtained.

EXAMPLE 1

The production of a multilayered special paper is performed in the same way as described in Comparative Example 1, using an anionic digester starch designated Retamyl® AP (AVEBE Company) and the cationic Praestafix® HH (Stockhausen GmbH & Co. KG) instead of the above cationic starch. The dispersion is produced by dispersing the anionic digester starch in water and adding the cationic polymer in an amount of 6 parts by weight, relative to the starch, with stirring to the dispersing tank. The aqueous dispersion is heated in the dispersing tank and maintained at a constant temperature of 40–45° C. The dispersion is sprayed between the layers of the wet paper webs in an amount of 6 wt.-%, relative to the paper production. After drying, a base paper having a ply strength of 1.900 N/cm and a layer strength of 1.640 N/cm is obtained.

In subsequent processing steps on the special paper, the paper web is reheated, which reheating so far has normally resulted in an embrittlement of an adhesive layer consisting exclusively of starch. This process is simulated using a test wherein a paper sample is heated at 130° C. for 30 minutes and maintained, and the layer strength is measured immediately after this heat treatment. Subsequently, the sample is re-conditioned under normal conditions at 23° C. and 50% relative humidity. The change in the paper properties during this process is monitored by measuring the strength. The test results of the paper samples of Comparative Example 1 and Example 1 are summarized in Table 1.

TABLE 1

Changes in layer strength [N/cm] prior to and after heating and after re-conditioning of the sample

| Sample | Immediately | 30 min/ 130° C. | Loss of strength (%) | Re-cond. 5 min | Re-cond. 15 min | Re-cond. 30 min |
|---|---|---|---|---|---|---|
| Comparative | 1.700 | 0.760 | 55.3 | 1.265 | 1.600 | 1.665 |
| Example 1 | 1.770 | 0.840 | 52.5 | 1.330 | 1.625 | 1.735 |
| Ø | 1.735 | 0.800 | 53.9 | 1.2975 | 1.613 | 1.700 |
| Example 1 | 1.865 | 1.025 | 45.0 | 1.365 | 1.665 | 1.770 |
| Ø | 1.935 | 1.095 | 43.4 | 1.400 | 1.600 | 1.865 |
|  | 1.900 | 1.060 | 44.2 | 1.383 | 1.633 | 1.818 |

The ply strength is the measured value of the strength between an outer layer and the remaining other layers of the paper.

The layer strength is the measured value in the center of a multilayered paper with symmetrical structure.

The measurement readings are obtained by separating and subsequent pulling apart the paper layers, using a tensile strength tester in accordance with ASTM F 904-91.

The paper of Example 1 has high layer strength which is maintained even after heating, because embrittlement of the adhesive is prevented as a result of using the adhesive dispersions according to the invention.

EXAMPLES 2 TO 7 AND COMPARATIVE EXAMPLE 2

In a laboratory test, two sheets having 100 g/m² each were produced on the sheet-forming device using a pulp mixture having a content of 3 wt.-% of dry substance, diluted with tap water to make 1 wt.-%. One wet sheet was stored on chromocardboard, while the second wet sheet on the sheet-forming screen was treated with 10 g of a 2 wt.-% adhesive dispersion by spraying with a spraying flask.

The adhesive dispersion for Comparative Example 2 had previously been prepared from a cationic starch, product designation Emcat® C 12 (Emsland Stärke Company), and for Examples 2 to 7 from anionic starches with the product designations Retamyl® AP and Aniofax® AP 25 (both from AVEBE Company) and various cationic polyelectrolytes, where the weight ratio of starch component to cationic polyelectrolyte was 16:1 each time, and the mixture was heated for 10 minutes to 30 and 40° C., respectively.

Following spraying, both sheets were couched on a screen using a roll, and then dried for 15 minutes in a vacuum dryer at 95° C. Three two-layered sheets were produced each time, using an adhesive dispersion, the layer strength of which was determined after conditioning the sheets at 23° C. and 50% relative humidity, or immediately after heating for 30 minutes in a drying oven at 130° C. The compositions of the adhesive dispersions employed, and the measured data of the strength determinations are illustrated in Table 2.

TABLE 2

|  |  | Temperature (° C.) after heating the mixture | Initial value (cond. sample) N/cm | Sample after heat treatm. 30 min/130° C. N/cm | Loss % |
|---|---|---|---|---|---|
| Comp. Ex. 2 | Emcat ® C 12 | 30 | 1.065 | 0.600 | 43.7 |
| Example 2 | Retamyl ® AP + Praestafix ® HH | 30 | 1.375 | 1.000 | 27.3 |
| Example 3 | Retamyl ® AP + Polyamin ® SK[1)] | 40 | 1.530 | 1.135 | 25.8 |
| Example 4 | Retamyl ® AP + Cartiofast ® PL[2)] | 40 | 1.665 | 1.200 | 27.9 |
| Example 5 | Retamyl ® AP + Cartiofast ® 8106[3)] | 30 | 1.615 | 1.225 | 24.1 |
| Example 6 | Retamyl ® AP + Cartafix ® DPR[4)] | 40 | 1.400 | 1.000 | 28.6 |
| Example 7 | Aniofax ® AP 25 + Praestafix ® HH | 40 | 1.330 | 0.865 | 35.0 |

[1)]Polyethyleneimine, modified, high molecular weight, BASF AG
[2)]Polyethyleneimine, high molecular weight, BASF AG
[3)]Polyvinylamine, m.w. about 300,000 g/mol, BASF AG
[4)]Polyamine, m.w. about 60,000 g/mol, SANDOZ Products, Ltd.

EXAMPLE 8 AND COMPARATIVE EXAMPLE 3

In the production of test liner III, which is a paper and corrugated cardboard paper classification of the European Association of Corrugated Paper Manufacturers with a gram weight of 190 g/m², on the basis of waste paper using an endless wire papermaking machine, the wet paper webs produced on two endless wires were sprayed at a dry content of 10–15 wt.-% with an aqueous adhesive dispersion comprised of anionic starch (Retamyl® AP) and the cationic Praestafix® HH polymer at a ratio of 16:1 as above. The components were admixed with a 2 wt.-% aqueous adhesive dispersion and heated at a temperature of 40° C. At a production rate of 4 t/hour, 20 kg/hour of Retamyl® AP and 5 kg/hour of Praestafix® HH were continuously employed, as compared to 20 kg/hour of a modified wheat starch (Comparative Example 3). The treated webs were contacted, couched at a speed of 200 to 250 m/min, and subsequently compressed as one web and dried. Using production samples, the bursting pressure was measured according to ISO 2758 (1983), and the tear resistance and water-absorbing capacity of the sizing were determined (Cobb Method, ISO 535 (1991)). The measured data are illustrated in Table 3.

TABLE 3

Test liner III, 190 g/m², PM 2 Duplex

|  | Bursting pressure [kPa] | Tear resistance [J/m] | Water absorption g/m² [Cobb 60 s] |
|---|---|---|---|
| Comparative Example 3 | 512 | 272 | 25 |
| Example 8 | 532 | 370 | 27 |

In addition to the marked improvement in tear resistance by 36%, the bursting strength is also favorably biased. In contrast, the sizing (or water absorption) is not significantly changed.

EXAMPLE 9 TO 15 AND COMPARATIVE EXAMPLE 4

Using a pulp mixture with a content of 2.9 wt.-%, two-layered sheets were produced in analogy to the procedures of Examples 2 to 7, using aqueous adhesive dispersions according to the invention. The dispersions were obtained by heating a dispersion of cationic starch (Emcat® C 12) and the cationic Praestafix® HH polymer, or the cationic polymer product A 6309, or the anionic copolymer of acrylamide and sodium acrylate, Praestamin® AL (both from Stockhausen GmbH & Co. KG), or by heating dispersions of anionic starch (Retamyl® AP) and the same above-mentioned polyelectrolytes, or by heating a dispersion of Mowiol® 28-99/G2 with Praestafix® HH, or of Walocel® XC 3.000 G with Praestamin® AL. Each of these products was employed at a ratio of 16:1, relative to the ratio of adhesive polymer to polyelectrolyte. Comparative Example 4 was produced in analogy to Comparative Example 2, using Emcat® C 12 alone.

Again, the layer strength was determined after heating in a drying oven at 130° C. in comparison to a paper sample produced using Emcat® C 12 alone. The measured data are illustrated in Table 4.

TABLE 4

|  |  | Temperature (° C.) after heating the mixture | Initial value (cond. sample) N/cm 22° C. | Sample after heat treatm. 30 min/130° C. N/cm | Loss % |
|---|---|---|---|---|---|
| Comp. Ex. 4 | Emcat ® C 12 | 30 | 0.800 | 0.425 | 46.9 |
| Example 9 | Retamyl ® AP + Praestafix ® HH | 40 | 1.735 | 1.265 | 27.1 |
| Example 10 | Retamyl ® AP + Product A6309[1] | 40 | 1.600 | 1.265 | 20.9 |
| Example 11 | Emcat ® C 12 + Praestafix ® HH | 40 | 0.760 | 0.535 | 29.6 |
| Example 12 | Emcat ® C 12 + Product A6309[1] | 40 | 0.720 | 0.495 | 31.3 |
| Example 13 | Emcat ® C 12 + Praestamin ® A1[1] | 40 | 0.720 | 0.505 | 29.9 |
| Example 14 | Mowiol ® 28–99/G2[2] Praestafix ® HH | 40 | 1.200 | 0.865 | 27.9 |
| Example 15 | Walocel ® XC3.000G[3] Praestafix ® HH | 40 | 1.530 | 1.200 | 21.6 |

[1]Stockhausen GmbH & Co. KG
[2]Hoechst AG
[3]Wolff Walsrode AG

EXAMPLES 16–21 AND COMPARATIVE EXAMPLES 5–10

The adhesive dispersions were produced by introducing the Retamyl® AP anionic starch in water with stirring; the water had previously been heated at 40° C. Thereafter, 0.125 wt.-% of the Praestafix® HH cationic polymer and the polyalkylene glycols Polyglycol 300 (Contensio Chemicals GmbH) and Polyglycol 10000S (Clariant GmbH), respectively, were added one by one, likewise with stirring.

In Comparative Examples 5–10, the adhesive dispersion was produced from the conventionally used Emcat® C12 cationic starch, with addition of Polyglycol 300 and Polyglycol 10000S, respectively.

The sole use of an anionic starch, or of a combination of an anionic starch with polyalkylene glycol in the industrial production of multilayered paper is not possible because—as taught by experience—the paper layers undergo displacement already on the paper machine.

Using a pulp mixture with a content of 2.9 wt.-%, two-layered sheets were produced in analogy to the procedure of Examples 2–7, using these adhesive dispersions.

The compositions of the adhesive dispersions and the ascertained data regarding the layer strength of the multi-layered sheets at 23° C. and after treating the sheets for 30 min at 130° C. are summarized in the following Table 5. The quantity figures in % by weight refer to the pulp mixture dry matter.

TABLE 5

|  |  | 23° C. N/cm | After 30 min at 130° C. N/cm |
|---|---|---|---|
| Examples |  |  |  |
| 16* | 2.0% Retamyl ® AP + 0.1% Polyglycol 300 | 1.840 | 1.310 |
| 17* | 2.0% Retamyl ® AP + 0.2% Polyglycol 300 | 2.065 | 1.375 |
| 18* | 2.0% Retamyl ® AP + 0.4% Polyglycol 300 | 1.775 | 1.200 |
| 19* | 2.0% Retamyl ® AP + 0.1% Polyglycol 1000S | 1.600 | 1.040 |
| 20* | 2.0% Retamyl ® AP + 0.2% Polyglycol 1000S | 1.385 | 0.935 |
| 21* | 2.0% Retamyl ® AP + 0.4% Polyglycol 1000S | 1.665 | 1.015 |
| Comparative Examples |  |  |  |
| 5 | 2.0% Emcat ® C12 + 0.1% Polyglycol 300 | 0.735 | 0.455 |
| 6 | 2.0% Emcat ® C12 + 0.2% Polyglycol 300 | 0.600 | 0.420 |
| 7 | 2.0% Emcat ® C12 + 0.4% Polyglycol 300 | 0.600 | 0.395 |
| 8 | 2.0% Emcat ® C12 + 0.1% Polyglycol 10000S | 0.600 | 0.380 |
| 9 | 2.0% Emoat ® C12 + 0.2% Polyglycol 10000S | 0.655 | 0.385 |
| 10 | 2.0% Emcat ® C12 + 0.4% Polyglycol 10000S | 0.505 | 0.400 |

*0.125 wt.-% Praestafix ® HH

EXAMPLES 22–25

Further adhesive dispersions were produced in analogy to the production procedure of Examples 16–21 using the Retamyl® AP anionic starch wherein, in addition to the Praestafix® HH cationic polymer, a modified melamine-form-aldehyde resin from Vianova Resins Company, designated Madurit® MW114 30% WA TZ, or a polyamideamine-epichlorohydrin resin from BK Giulini Chemie Company, designated Giluton 1100/28 N, were used as component B), and each of these resins were used as component B) alone with Polyglycol 300. The addition of Polyglycol 300 was effected after adding the cationic polyelectrolytes to the starch dispersed in water.

Using a pulp mixture with a content of 2.9 wt.-%, two-layered sheets were produced in analogy to the procedure of Examples 2–7, using these adhesive dispersions. The compositions of the adhesive dispersions and the data regarding the strength are illustrated in Table 6. The quantity figures in % by weight refer to the pulp mixture dry matter.

TABLE 6

| Examples | | 23° C. N/cm | After 30 min at 130° C. N/cm | Loss % |
|---|---|---|---|---|
| 22 | 2.0% Retamyl ® AP/ 0.125% Praestafix ® HH + 0.2% Madurit ® MW 114 | 1.735 | 1.200 | 30.8 |
| 23 | 2.0% Retamyl ® AP/ 0.125% Praestafix ® HH + 0.1% Giluton ® N 1100/28 | 1.495 | 1.000 | 33.1 |
| 24 | 2.0% Retamyl ® AP/ 0.125% Madurit ® MW 114 + 0.2% Polyglycol 300 | 1.800 | 1.080 | 40.0 |
| 25 | 2.0% Retamyl ® AP/ 0.125% Giluton ® N 1100/28 + 0.4% Polyglycol 300 | 1.800 | 1.095 | 39.2 |

EXAMPLES 26–29

In analogy to the procedure of Examples 2–7, adhesive dispersions were produced at 40° C. from the Retamyl® AP anionic starch and the Praestafix® HH cationic polymer, using fractions of a specific grain size of the starch particles in a range of from more than 200 µm to less than 63 µm. The figures regarding the composition of the adhesive dispersion in % by weight refer to the pulp mixture dry matter. Two-layered sheets were produced in accordance with the procedure of Examples 2–7, using these adhesive dispersions. The data are summarized in Table 7.

TABLE 7

| Examples | | 23° C. N/cm | After 30 min at 130° C. N/cm |
|---|---|---|---|
| 26 | 2% Retamyl ® AP >200 µm/ 0.125% Praestafix ® HH | 1.360 | 1.135 |
| 27 | 2% Retamyl ® AP >100 µm/ 0.125% Praestafix ® HH | 1.625 | 1.105 |
| 28 | 2% Retamyl ® AP >63 µm/ 0.125% Praestafix ® HH | 1.935 | 1.240 |
| 29 | 2% Retamyl ® AP <63 µm/ 0.125% Praestafix ® HH | 1.665 | 1.040 |

The adhesive dispersions according to the invention achieve improved layer strength values when using the anionic starch with a particle size ranging from 50 to 200 µm, preferably from 50 to 100 µm as component A).

What is claimed is:

1. An aqueous adhesive dispersion consisting essentially of
   A) 0.1–6 wt. %, relative to the total weight of the dispersion, of an adhesive polymer in dispersed form,
   B) 0.1–10 parts by weight, relative to 100 parts by weight of component A), of an anionic or cationic polymeric, water soluble or water-swellable polyelectrolyte, and
   C) 0–50 parts by weight, relative to 100 parts by weight of component A), of at least one polyalkylene glycol having a molar mass ranging from 200 to 100,000 g/mol, and optionally other additives,
   wherein at least one water-soluble or water-swellable cationic or anionic synthetic homo- or copolymer of monoethylenically unsaturated monomers having acid groups, which at least partially are present as salts or as esters or amides of dialkylaminoalkylalcohols or -amines in protonated or quaternized form, and optionally other monoethylenically unsaturated monomers, Mannich bases of polymers containing acrylamide, polyvinylamines, polyamines, and polyalkylenepolyamines, having molar masses of from 450 to 100,000 g/mol, melamine-formaldehyde condensation products, urea-formaldehyde condensation products in anionic and cationic modification, or polyamidoamine-epichlorohydrin resins or mixtures thereof are used as component B).

2. The adhesive dispersion according to claim 1, wherein the adhesive dispersion contains 2–6 wt.-% of component A), relative to the total weight of the dispersion.

3. The adhesive dispersion according to claim 1, wherein the adhesive dispersion contains 0.1–30 parts by weight, relative to 100 parts by weight of component A), of at least one polyalkylene glycol.

4. The adhesive dispersion according to claim 1, wherein at least one natural or synthetic polymer is used as component A).

5. The adhesive dispersion according to claim 4, wherein native starch, modified starch, cellulose ethers, guar meal, alginates, proteins, and/or polyvinyl alcohol are used as component A).

6. The adhesive dispersion according to claim 5, wherein cationic or anionic starch is employed as component A).

7. The adhesive dispersion according to claim 1, wherein at least one polyethylene glycol is used as component C).

8. The adhesive dispersion according to claim 1, wherein component B) does not act as a flocculant below the gelatinization temperature of component A).

9. The adhesive dispersion according to claim 1, wherein acrylic acid, methacrylic acid, maleic acid, itaconic acid, crotonic acid, and vinylsulfonic acid, (meth)acrylamidoalkanesulfonic acids, 2-sulfoethyl methacrylate, styrenesulfonic acid, vinylphosphonic acid, and/or styrenephosphonic acid, as well as their alkali or ammonium salts are present as recurring units in the anionic homo- or copolymers as monoethylenically unsaturated monomers containing acid groups, and (meth)acrylic acid esters with dialkylaminoalkylalcohols or (meth)acrylic acid amides with dialkylaminoalkylamines in protonated or quaternized form are present as recurring units in the cationic homo- or copolymers.

10. The adhesive dispersion according to claim 1, wherein component A) and component B) exhibit dissimilar ionogenicity.

11. A process for producing multilayered paper or a sheet material comprising paper material and formed of at least 2 paper webs, by coating an aqueous adhesive dispersion onto at least one paper web in wet condition, compressing and drying the combined paper webs, wherein a dispersion according to claim 1 is used as adhesive dispersion.

12. The process according to claim 11, wherein the adhesive dispersion is sprayed onto at least one paper web.

13. The adhesive dispersion according to claim 4 wherein said at least one natural or synthetic polymer is selected of the group consisting of a polysaccharide, a modified polysaccharide, a protein, a polyvinyl alcohol, and mixtures thereof.

14. The adhesive dispersion according to claim 3, wherein the adhesive dispersion contain 0.1 to 20 parts by weight relative to 100 parts by weight of component A, of at least one polyalkylene glycol.

15. The adhesive dispersion according to claim 1, wherein the weight ratio of component A) to component B) is from 4:1 to 25:1.

16. The adhesive dispersion according to claim 15, wherein the weight ratio of component A) to component B) is from 10:1 to 25:1.

17. The adhesive dispersion according to claim 16, wherein the weight ratio of component A) to component B) is from 14:1 to 20:1.

18. The adhesive dispersion according to claim 1, wherein 2-acrylamido-2-methylpropanesulfonic acid is used as component B).

* * * * *